United States Patent
Matin et al.

(10) Patent No.: US 7,635,932 B2
(45) Date of Patent: Dec. 22, 2009

(54) DYNAMOELECTRIC MACHINE HAVING HEAT PIPES EMBEDDED IN STATOR CORE

(75) Inventors: Kaiser Matin, Herndon, VA (US); Zareh Salmasi Soghomonian, Sterling, VA (US)

(73) Assignee: Bluwav Systems, LLC, Rochester Hills, MI (US)

( * ) Notice: Subject to any disclaimer, the term of this patent is extended or adjusted under 35 U.S.C. 154(b) by 293 days.

(21) Appl. No.: 10/920,416

(22) Filed: Aug. 18, 2004

(65) Prior Publication Data

US 2006/0038450 A1 Feb. 23, 2006

(51) Int. Cl.
*H02K 9/00* (2006.01)
(52) U.S. Cl. .......................... 310/58; 310/64
(58) Field of Classification Search .............. 310/52, 310/54, 58, 64
See application file for complete search history.

(56) References Cited

U.S. PATENT DOCUMENTS

| | | | |
|---|---|---|---|
| 1,700,840 A * | 2/1929 | Frazer | 310/52 |
| 2,898,542 A | 8/1959 | Wasko et al. | |
| 3,340,748 A | 9/1967 | Young | |
| 3,604,406 A | 9/1971 | Hottelet | |
| 3,681,628 A | 8/1972 | Krastchew | |
| 3,715,610 A * | 2/1973 | Brinkman | 310/54 |
| 3,719,881 A | 3/1973 | Shibata et al. | |
| 3,801,843 A * | 4/1974 | Corman et al. | 310/52 |
| 3,914,859 A | 10/1975 | Pierson | |
| 4,012,651 A | 3/1977 | Burson | |
| 4,022,083 A | 5/1977 | Pollak-Banda et al. | |
| 4,106,603 A | 8/1978 | Walter | |
| 4,165,795 A | 8/1979 | Lynch et al. | |

(Continued)

FOREIGN PATENT DOCUMENTS

DE 3602606 7/1987

(Continued)

OTHER PUBLICATIONS

Zhu Z Q et al., "Influence of Design Parameters on Cogging Torque in Permanent Magnet Machines", Dec. 1, 2000, IEEE Transactions on Energy Conversion.

(Continued)

*Primary Examiner*—Nguyen N Hanh
(74) *Attorney, Agent, or Firm*—Alex Porat; Magna International Inc.

(57) ABSTRACT

Thermal management of an electric machine is implemented by selecting a stator core configuration in accordance with an intended machine application and determining the minimum heat dissipation necessary to maintain the temperature of the core segment configuration at peak excitation within acceptable limits is determined. A core model is used to ascertain thermal distribution at peak excitation. In accordance therewith, a pattern in the selected core segment configuration is established for placement of at least one heat pipe for removing heat from the core. Preferably, heat pipes are located at high thermal points in the core segment and oriented in alignment with mapped lines of flux. By placing the heat pipe either at the center of the core or at a recessed boundary layer between the core and winding, the heat pipe can capture and conduct excess heat away from the heat generating areas of the core, thus maintaining the core and the excitation windings at desired temperature.

1 Claim, 5 Drawing Sheets

U.S. PATENT DOCUMENTS

| | | |
|---|---|---|
| 4,199,037 A | 4/1980 | White |
| 4,293,281 A | 10/1981 | Lamoreaux |
| 4,315,171 A | 2/1982 | Schaeffer |
| 4,322,646 A | 3/1982 | Persson |
| 4,392,393 A | 7/1983 | Montgomery |
| 4,424,463 A | 1/1984 | Musil |
| 4,449,578 A | 5/1984 | Munekawa |
| 4,458,228 A | 7/1984 | Baumgartner |
| 4,516,044 A | 5/1985 | Bone |
| 4,533,011 A | 8/1985 | Heidemeyer et al. |
| 4,540,888 A | 9/1985 | Drewry et al. |
| 4,556,247 A | 12/1985 | Mahaffey |
| 4,574,210 A | 3/1986 | Wieland |
| 4,595,841 A | 6/1986 | Yaguchi |
| 4,647,835 A | 3/1987 | Fujikawa et al. |
| 4,685,867 A | 8/1987 | Patun et al. |
| 4,754,207 A | 6/1988 | Heidelberg et al. |
| 4,786,834 A | 11/1988 | Grant et al. |
| 4,835,405 A | 5/1989 | Clancey et al. |
| 4,864,176 A | 9/1989 | Miller et al. |
| 4,941,854 A | 7/1990 | Takahashi et al. |
| 4,961,403 A | 10/1990 | Kawaguchi et al. |
| 4,980,588 A | 12/1990 | Ogawa |
| 5,015,903 A | 5/1991 | Hancock et al. |
| 5,019,733 A | 5/1991 | Kano et al. |
| 5,030,867 A | 7/1991 | Yamada et al. |
| 5,081,365 A | 1/1992 | Field et al. |
| 5,111,090 A | 5/1992 | Otake et al. |
| 5,164,623 A | 11/1992 | Shkondin |
| 5,253,891 A | 10/1993 | Carlin et al. |
| 5,258,697 A | 11/1993 | Ford et al. |
| 5,264,764 A | 11/1993 | Kuang |
| 5,347,188 A | 9/1994 | Iseman et al. |
| 5,397,922 A | 3/1995 | Paul et al. |
| 5,441,122 A | 8/1995 | Yoshida |
| 5,614,809 A | 3/1997 | Kiuchi et al. |
| 5,747,909 A | 5/1998 | Syverson et al. |
| 5,814,909 A | 9/1998 | Yamada et al. |
| 5,854,521 A | 12/1998 | Nolle |
| 5,898,282 A | 4/1999 | Drozdz et al. |
| 5,899,174 A | 5/1999 | Anderson et al. |
| 5,918,360 A | 7/1999 | Forbes et al. |
| 5,925,947 A | 7/1999 | Kajiwara et al. |
| 5,960,866 A | 10/1999 | Kimura et al. |
| D416,858 S | 11/1999 | Domanski |
| 6,018,200 A | 1/2000 | Anderson et al. |
| 6,026,921 A | 2/2000 | Aoyama et al. |
| 6,087,744 A | 7/2000 | Glauning |
| 6,094,011 A | 7/2000 | Notsu |
| 6,100,599 A | 8/2000 | Kouchi et al. |
| 6,114,784 A * | 9/2000 | Nakano ................. 310/59 |
| 6,160,332 A | 12/2000 | Tsuruhara |
| 6,181,035 B1 | 1/2001 | Acquaviva |
| 6,188,159 B1 | 2/2001 | Fan |
| 6,198,183 B1 | 3/2001 | Baeumel et al. |
| 6,278,216 B1 | 8/2001 | Li |
| 6,278,915 B1 | 8/2001 | Deguchi et al. |
| 6,290,215 B1 | 9/2001 | Pinsker |
| 6,300,702 B1 * | 10/2001 | Jack et al. ................. 310/216 |
| 6,306,056 B1 | 10/2001 | Moore |
| 6,333,620 B1 | 12/2001 | Schmitz et al. |
| 6,362,533 B1 | 3/2002 | Morohoshi et al. |
| 6,374,905 B1 | 4/2002 | Tantoush |
| 6,384,496 B1 | 5/2002 | Pyntikov et al. |
| 6,414,399 B1 | 7/2002 | Bianchi |
| 6,421,599 B1 | 7/2002 | Lippa et al. |
| 6,424,891 B1 | 7/2002 | Sargent et al. |
| 6,474,068 B1 | 11/2002 | Abdel Jalil et al. |
| 6,492,756 B1 | 12/2002 | Maslov et al. |
| 6,492,758 B1 | 12/2002 | Gianni et al. |
| 6,536,207 B1 | 3/2003 | Kamen et al. |
| 6,547,527 B2 | 4/2003 | Gaither |
| 6,608,393 B2 | 8/2003 | Anderson |
| 6,617,746 B1 | 9/2003 | Maslov et al. |
| 6,622,804 B2 | 9/2003 | Schmitz et al. |
| 6,639,511 B2 | 10/2003 | Haruna et al. |
| 6,651,732 B2 | 11/2003 | Sagal |
| 6,651,759 B1 | 11/2003 | Gruenwald et al. |
| 6,660,967 B2 | 12/2003 | Brofft et al. |
| 6,664,692 B1 | 12/2003 | Kristoffersen |
| 6,677,684 B1 | 1/2004 | Kennedy |
| 6,680,188 B2 | 1/2004 | Webster et al. |
| 6,680,550 B2 * | 1/2004 | Matsunaga et al. ............ 310/58 |
| 6,707,185 B2 | 3/2004 | Hemmi et al. |
| 6,717,323 B1 | 4/2004 | Soghomonian et al. |
| 6,720,688 B1 | 4/2004 | Schiller |
| 6,722,458 B2 | 4/2004 | Hofbauer |
| 6,745,117 B1 | 6/2004 | Thacher et al. |
| 6,753,620 B2 | 6/2004 | Fukuda |
| 6,762,525 B1 | 7/2004 | Maslov et al. |
| 6,784,560 B2 | 8/2004 | Sugimoto et al. |
| 6,819,016 B2 * | 11/2004 | Houle et al. ................... 310/52 |
| 6,822,353 B2 | 11/2004 | Koga et al. |
| 6,849,961 B2 | 2/2005 | Takizawa et al. |
| 6,877,581 B2 | 4/2005 | Badr et al. |
| 6,894,625 B1 | 5/2005 | Kozma et al. |
| 6,933,633 B2 * | 8/2005 | Kaneko et al. ................ 310/52 |
| 6,938,400 B2 | 9/2005 | Fillman et al. |
| 6,943,467 B2 | 9/2005 | Potoradi et al. |
| 6,966,740 B2 | 11/2005 | Mast et al. |
| 7,005,756 B2 | 2/2006 | Westerbeke, Jr. |
| 7,119,450 B2 | 10/2006 | Albrecht |
| 7,224,132 B2 | 5/2007 | Cho et al. |
| 2002/0123836 A1 | 9/2002 | Komiyama et al. |
| 2003/0000689 A1 | 1/2003 | Kuo et al. |
| 2004/0011918 A1 | 1/2004 | Musial et al. |
| 2004/0124733 A1 | 7/2004 | Yamamoto et al. |
| 2004/0155539 A1 | 8/2004 | Potoradi et al. |
| 2005/0179262 A1 | 8/2005 | Cho et al. |
| 2006/0157987 A1 | 7/2006 | Albrecht |
| 2007/0050119 A1 | 3/2007 | Tamai et al. |

FOREIGN PATENT DOCUMENTS

| | | |
|---|---|---|
| DE | 4032606 | 3/1992 |
| DE | 19614862 | 11/1997 |
| DE | 19636591 | 3/1998 |
| DE | 19641254 | 4/1998 |
| DE | 19744422 | 4/1998 |
| DE | 19723913 | 12/1998 |
| DE | 199 24 038 | 11/2000 |
| DE | 10063941 | 7/2002 |
| EP | 0192469 | 8/1986 |
| EP | 0463168 | 2/1992 |
| EP | 0698521 | 2/1996 |
| EP | 0 790 695 A1 | 8/1997 |
| EP | 0942517 | 9/1999 |
| EP | 1 052 761 | 11/2000 |
| EP | 1 130 748 A1 | 9/2001 |
| EP | 1329351 | 7/2003 |
| GB | 628763 | 9/1949 |
| GB | 1129709 | 10/1968 |
| GB | 1341894 A | 12/1973 |
| JP | 56162295 | 12/1981 |
| JP | 57049344 | 3/1982 |
| JP | 63183384 | 7/1988 |
| JP | 11164521 | 6/1999 |
| JP | 11313465 | 11/1999 |
| JP | 2001-119869 | 4/2001 |
| JP | 2002-159160 | 5/2002 |
| TW | 270254 | 1/2007 |
| WO | WO 00/74964 | 12/2000 |
| WO | WO 02/19504 | 3/2002 |
| WO | WO 03/056687 | 7/2003 |

| WO | WO 03/085807 | 10/2003 |
| WO | WO-03/105319 | 12/2003 |
| WO | WO 2004/025807 | 3/2004 |

OTHER PUBLICATIONS

"Study of Cogging Torgue in Permanent Magnet Machines", C. Studer, A. Keyhani, The Ohio State University, date unknown.

Terchnical Report, "Study of Cogging Torgue in Permanent Magnet Machines", C. Studer and A. Keyhani, The Ohio State University, 1998.

"Shape Optimization for Electromagnetic Devices",date unknown.

* cited by examiner

DYNAMOELECTRIC MACHINE HAVING HEAT PIPES EMBEDDED IN STATOR CORE

FIELD OF THE INVENTION

The present invention relates to a cooling system for a dynamoelectric machine and, more particularly, to a machine having cooling pipes embedded in stator core elements.

BACKGROUND ART

Development of efficient electric motor drives for vehicles, with improved electronic control systems and portable power sources, has drawn increasing attention as a viable alternative or adjunct to combustion engine drives. For example U.S. Pat. No. 6,492,756 to Maslov et al. and U.S. Pat, No. 6,617,746 to Maslov et al. describe motor structures that provide high torque output capability with minimum power consumption, thus especially suitable to electric vehicle propulsion. Electromagnets are used as isolated magnetically permeable structures configured in a stator annular ring. FIG. 1 is a plan view of a motor such as described in the U.S. Pat. No. 6,492, 756. Rotor member 20 is an annular ring structure having permanent magnets 22 substantially evenly distributed along cylindrical back plate 24. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally u-shaped magnetic structure 36 that forms two poles having surfaces 32 facing the air gap. The poles of each core segment are aligned in a direction that is perpendicular to the axis of rotation of the motor. The legs of the pole pairs are wound with windings 34, although the core segment may he constructed to accommodate a single winding formed on a portion linking the pole pair. Each stator electromagnet core structure is separate, and magnetically isolated, front adjacent stator core elements. The stator elements 36 are secured to a non-magnetically permeable support structure, thereby forming an annular ring configuration.

FIG. 2 is a partial three dimensional perspective view of a motor such as described in the U.S. Pat. No. 6,617,746. The poles 32 of each core segment are aligned in a direction parallel to the axis of rotation. The stator core segments are rigidly secured to plates 42, only one of which is shown in the drawing. The plates are affixed to a stationary shaft 38 in a manner more particularly described in the patent. An annular ring is thus formed of stator core segments that are coextensively aligned in the axial direction across the air gap from the rotor. The annular rotor backplate and attached permanent magnets are secured to housing 40, which is journalled to the shaft on the outside of the plates through appropriate bushings and bearings.

Isolation of the electromagnet groups in the above described configurations permits individual concentration of flux in the magnetic cores of the groups, with virtually no flux loss or deleterious transformer interference effects with other electromagnet members. Operational advantages are gained from this segmented electromagnetic architecture. Magnetic path isolation of an individual pole pair from other pole groups eliminates a flux transformer effect on an adjacent group when the energization of the pole pair windings is switched.

As discussed in the above identified patents, there is significant incentive to increase the torque and power density of a machine by improving the architectural configuration if the stator and rotor constituents. Magnetic circuit topologies have been developed that promote significant weight reduction in the magnetic mass, as well as gain improvement of the form factor of the magnetic design. Related U.S. Pat. No. 6,717,323 to Soghomonian describes benefits to be gained from utilization of three dimensional aspects of motor structure. Advantages are recognized from the use of materials such as a soft magnetically permeable medium that is amenable to formation of a variety of particular shapes. For example, core material may be manufactured from soft magnet grades of Fe, SiFe, SiFeCo, SiFeP powder material, each of which has a unique power loss, permeability and saturation level. Core geometries and core dimensions of stator elements, with relevant tolerances, can be fabricated without the need to form laminations. The magnetic potential gradient developed between coupled poles of rotor permanent magnets and stator electromagnets thus can he optimized. Copending U.S. patent application Ser. No. 10,761,305 of Soghomonian, filed Jan. 22, 2004 and entitled "Soil Magnetic Composites," discloses the manufacture of machine cores of soft magnetically permeable materials. The disclosure of that application is hereby incorporated by reference in the present description.

Electric traction systems demand high torque from low voltage propulsion units. The low voltage restriction satisfies a need to conserve space by minimizing the number of battery cells and eliminating extra insulation that otherwise would be required for high voltage protection. In order to deliver high torque from a low voltage source, it is necessary to draw high current through the motor windings. High current operation can produce excess heat, which must be eliminated to maintain efficient continuous operation and to avoid damage to the motor. A thermal management system is needed that can maintain machine operation within thermal limits. Such a system should be of light weight, and capable of installation in various motor topologies. Classical issues concerning copper, hysteresis and excess eddy current losses tend to dictate the need for new cooling methods. Machines commonly have either a cooling jacket embedded in its external housing or internally placed heat exchangers, possibly with liquid cooling ducts. In machines with laminated stator cores, there is little freedom for shaping cooling paths. Liquid cooling systems, which require pressurized coolant to be channeled through ducts or cooling jackets, have inherent risks. Excess pressure can cause leaks of the cooling fluid; poor sealing of joints could cause electrical shorts in the machine, as well as localized galvanic corrosion and erosion of the machine elements.

Commonly assigned copending U.S. application of Matin et al., application Ser. No. 10/893,878, filed Jul. 20, 2004 and entitled "Dynamoelectric Machine With Embedded Heat Exchanger," describes cooling systems for a motor that is particularly useful as a submersible solid shaft pump motor. The motor is enclosed in a sealed housing within which air can be circulated through the machine components for contact with one or more sealed containers. The sealed container, known as a "heat pipe," encloses a coolant medium, such as water. The pipe is lined with a porous "wick structure." The wick is saturated with a proper amount of working fluid. The atmosphere inside the heat pipe is set by an equilibrium of liquid and vapor. As heat enters an evaporator portion of the heat pipe, this equilibrium is upset and vapor is generated at a slightly higher pressure. The higher pressure vapor travels to a condenser end portion of the heat pipe where the slightly lower temperatures cause the vapor to condense giving up its latent heat of vaporization. The condensed fluid is then pumped back to the evaporator by the capillary forces developed in the wick structure.

The machine housing structure of the copending Matin application includes a central portion that includes the stator and rotor elements, and a cavity longitudinally adjacent the central portion in which a plurality of heat pipes are mounted. The heat pipes extend through the housing to external ends that are attached to cooling fins to facilitate heat transfer from the heat pipes to the external environment. The heat pipes provide heat transfer from the air circulated through the motor. Heat absorbed in the evaporating sections causes fluid to boil to the vapor phase. Thermal energy is released at the condensing sections to the cooling fins that dissipate heat away from the heat pipes.

The cooling system of the Matin et al. application is positioned in a relatively large structure that is not particularly constrained by space and weight considerations. The advantages described in the Matin et al. application would be beneficial for machines in vehicle traction drives, for example, wherein appropriate thermal management of SMC cores is essential for satisfactory operation. Such a cooling system should be readily amenable to installation in the immediate vicinity of the source of heat generation while conserving space and weight of the machine.

DISCLOSURE OF THE INVENTION

The present invention fulfills the above described needs, at least in part, by providing a method of thermal management of an electric machine having a stator formed, at least in part, of a plurality of soft magnetic composite (SMC) core segments distributed circumferentially about an axis of rotation. A stator core segment configuration is selected in accordance with at least one criterion for a specific machine application. The minimum heat dissipation necessary to maintain the temperature of the selected core segment configuration at peak excitation within acceptable limits is determined. A core model having a configuration corresponding to the selected configuration is used to ascertain thermal distribution at peak excitation. Based on the ascertained thermal distribution in the model, a pattern in the selected core segment configuration is established for placement of at least one heat pipe for removing heat from the core. A core segment is then formed from soft magnetic composite material in the selected configuration with the at least one heat pipe placed in accordance with the established pattern. Criteria for selection of the core configuration may be related to the number of salient poles to be formed in the core, to particular soft magnetic composite material characteristics, to the number of core segments, and to orientation, with respect to an axis of machine rotation, of core segments. The core model thermal distribution may be ascertained by mapping lines of flux created in the core model under excitation and the pattern then established by setting orientation of the heat pipe in alignment with the mapped lines of flux. Preferably, heat pipes are located at a high thermal point in the core segment in accordance with the ascertained thermal distribution model. A number of heat pipes to be placed in the core can be selected in accordance with the minimum heat dissipation determination.

Aspects of the present invention are applicable to an electric machine having a single ferromagnetic salient pole stator core as well as a machine that comprises a plurality of isolated multiple pole core segments. One or more heat pipes, at least partially embedded in the stator core, transfers heat generated during peak excitation of windings formed on the salient poles away from the heat source. The stator core may be formed either partially or totally of SMC material. A portion of the heat pipe may protrude from the ferromagnetic stator core to be coupled to a heat exchanger to transfer heat from the heat pipe away from the stator core. Alternatively, the heat exchanger may be situated within the stator core at a site away from the heat generating pole locations.

The stator may comprise a plurality of multiple pole core segments distributed circumferentially about an axis of rotation, each core segment having embedded therein at least one heat pipe. Preferably, the heat pipe is positioned in the stator core in alignment with lines of flux created in the core during excitation of the windings to avoid adversely effecting flux distribution. One heat pipe may be situated in a central portion of each pole of the stator core and extend along a radial direction from the axis. Such heat pipe configuration may be advantageously implemented in stator core segments having poles aligned in a direction perpendicular to the axis as well as stator core segments having poles aligned in a direction parallel to the axis.

The heat pipe may be formed with a T-shaped configuration. A first portion is partially embedded in the stator core along the radial direction and a second portion situated outside of the stator core, the first and second portions generally perpendicular to each other. In another aspect of the invention, a two-pole core segment may share a U-shaped heat pipe. The heat pipe may be completely embedded within the core segment, each leg extending into the heat-generating center portion of each adjacent pole. The heat pipe portion linking the legs is situated distally from the pole faces.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
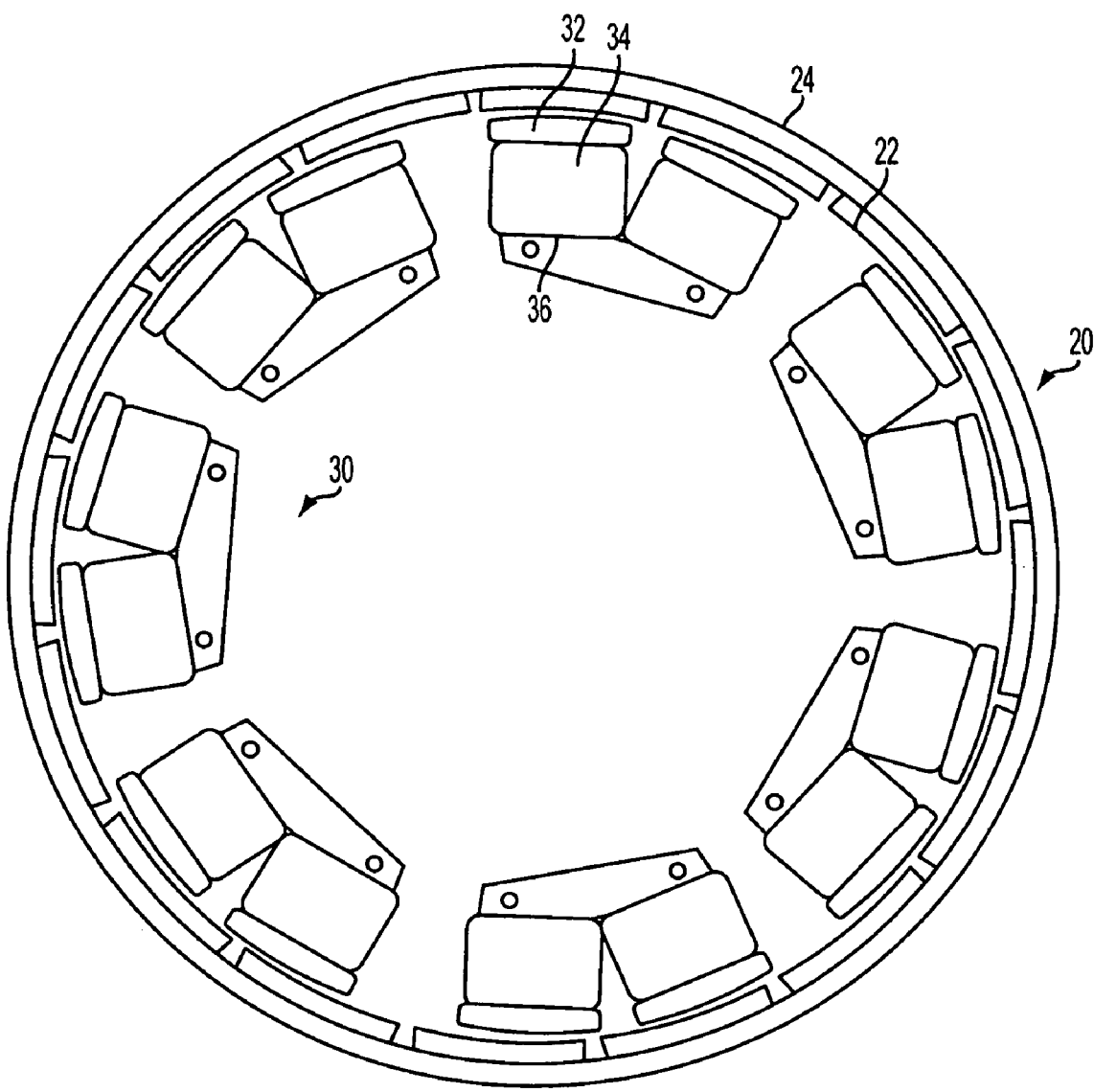
FIG. 1 is a plan view of a motor having isolated electromagnet stator core segments, the poles of each core segment being aligned in a direction that is perpendicular to the axis of rotation of the motor.

Computational Fluid Dynamic (CFD) models have confirmed that in a typical magnetic design, a wound magnetic core material can exhibit very high thermal signatures under peak excitation. Depending on the thermal heat capacity and conductivity of the copper or aluminum winding and the core, heat dissipation may be effected by convection and conduction. With the development of SMC technology, heat pipes are used in the present invention for localized cooling of stator cores. Heat pipes advantageously are embedded in SMC material, in contrast to laminated iron cores for which such procedure cannot be effectively realized. The heat pipes can be embedded in the SMC parts in one of two ways; either by shrink-fitting or by bonding them in existing cavities in the SMC cores. In either method, a deep cavity is formed in the bulk of the SMC core. The diameter of the cavity is proportional to the outer diameter of the heat pipe. The length of the cavity does not extend all the way to the surface of the core shoe. The cavity can be formed using an insert rod in the soft magnetic powder tool during the compaction of the part. The tool design of the powder part allows the insert rod to be introduced during pouring of the powder in the die cavity, after which the powder is compacted by an upper and lower puncher under a predefined compaction pressure. After the compaction cycle, the insert rod is extracted and the part is ejected without causing microscopic fractures around the formed cavity. The part is then heat treated and ready for assembly of the heat pipes.

In the shrink fitting method, during assembly, the parts can be slightly heated up to approximately 100-110° C. in a clean, dry and moist-free atmosphere to allow for a slight and yet uniform expansion of the part. At this point the heat pipe may be inserted into the expanded cavity and left to cool with the part at room temperature. The natural contraction of the part will allow the heat pipe to be kept securely in position in the part. In the bonding method, during the assembly, a thin layer of thermally conductive epoxy is applied to the heat pipe and then inserted into the cavity of the SMC part. This method does not require pre-heating of the part. The epoxy is fully cured at room temperature. With both methods the exposed end of the heat pipe has to be carefully handled in order not to puncture, bend or damage the outer tubing of the heat pipe, which may be constructed of flexible material. During the assembly of the wound SMC cores, the exposed tubing of the heat pipe can be inserted in heat-exchanger blocks and bonded in place.

Heat exchange via conduction is an effective way of removing excess heat from the core with the use of heat pipes having high thermal conductivity. By placing the heat pipe either at the center of the core or at a recessed boundary layer between the core and winding, the heat pipe can capture and conduct excess heat, thus maintaining the core and the excitation windings at desired temperature. Of concern in the placement of the heat pipes is the avoidance interference with the required magnetic path flux distribution. It is therefore important to align the heat pipe along a path that does not cut the flux path orthogonally or at a lesser angle that may cause localized magnetic flux circulation in the core.

In accordance with the present invention, the components of a machine are selected to comport in shape and configuration with the required size, mass, functional and volumetric constraints applicable to the particular machine context. The components are considered individually to identify a symmetry design plane for repeatable sections. The sections may be isolated core segments or portions of an integral core. A desired pattern of magnetic flux in each section is determined. One or more cavities for heat pipes are aligned with the effective path of the magnetic flux. The cavities preferably are placed at regions that will exhibit the highest flux or MMF concentrations, which are generally located close to the excitation coils. CFD analysis on a core model of each individual component, as well as the entire magnetic circuit, can pinpoint the thermal conduction and convection characteristics of the configuration. In correspondence with the analysis of the prototyped component, one or more heat pipes with appropriate wick structure design are embedded in the machine component.

Figure 3:
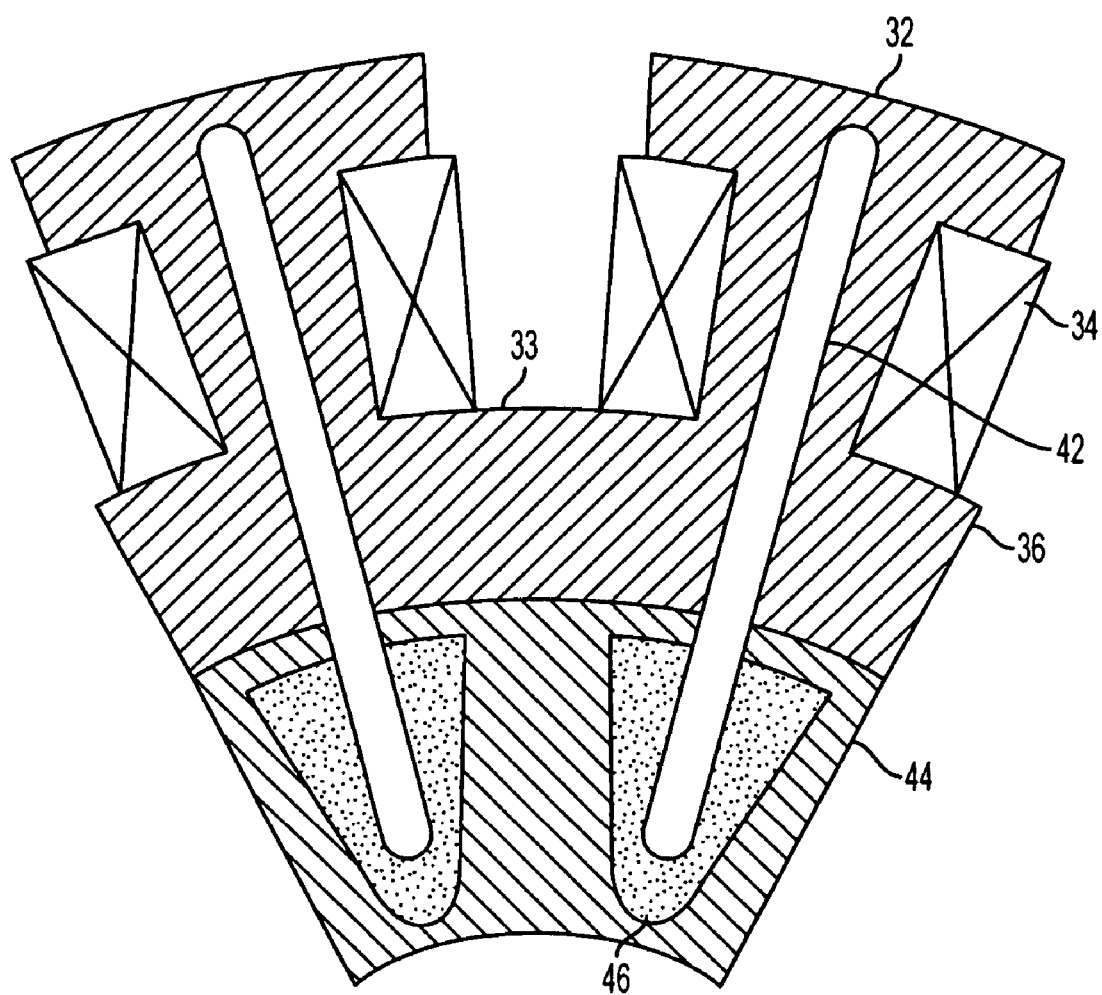
FIG. 3 is a diagram of a stator core segment having a cooling arrangement in accordance with the present invention.

FIG. 3 is a diagram of a stator core segment having a cooling arrangement in accordance with the present invention. Core segment 36 is constructed of SMC material and shown in a cross section taken in a plane perpendicular to the axis of rotation. The core segment may be one of a plurality of isolated core segments such as shown in FIG. 1, or may be a section of an integral stator core having like sections circumferentially distributed about an air gap. The core comprises a pair of poles 32 connected by a linking section 33. Each pole has a portion facing the air gap and a winding 34 formed thereon. Excitation of the windings creates a flux pattern in the pole pair that results in magnetization of the poles having opposite magnetic polarity at the air gap. During operation of the machine winding excitation is reversed in polarity at a high rate to effect motor (or generator) functionality while also incurring heat generation.

Bonded to the lower portion of core segment 36 is a nonmagnetic heat sink structure 44 that includes a porous portion 46. The porous portion may contain fins, cellular solids, carbon foam or other such materials that facilitate heat transfer. A cylindrical heat pipe 42 is embedded in each pole 32, extending from an area just below the pole surface in one direction to the structure 44 in the other direction. The heat pipe is located at the center of the pole and aligned with the direction of the lines of flux created when the winding is under excitation. Structure 44 and porous portion 46 are formed of highly thermal conductive material, such as aluminum. While the porous nature of portion 46 enhances heat sink functionality, portions 44 and 46 instead may be made of a single unitary material if desired.

During operation of the machine, upon excitation of a given magnetic section, the heat pipe will absorb heat created in the vicinity of the winding, causing the working fluid in the wick structure to evaporate. The vapor travels through the pipe and condenses due to pressure differential in the vaporizing section. The wick structure provides the capacity to absorb moisture from the condensing section. At the condensing section, the latent heat of vaporization is removed and released at the heat sink structure 44. This mechanism continues and reaches a steady state until the full vaporization capacity of the wick has been reached. The heat pipe and wick structure are selected to implement a stable heat exchange system for the peak and continuous operating conditions of the machine.

Figure 4:
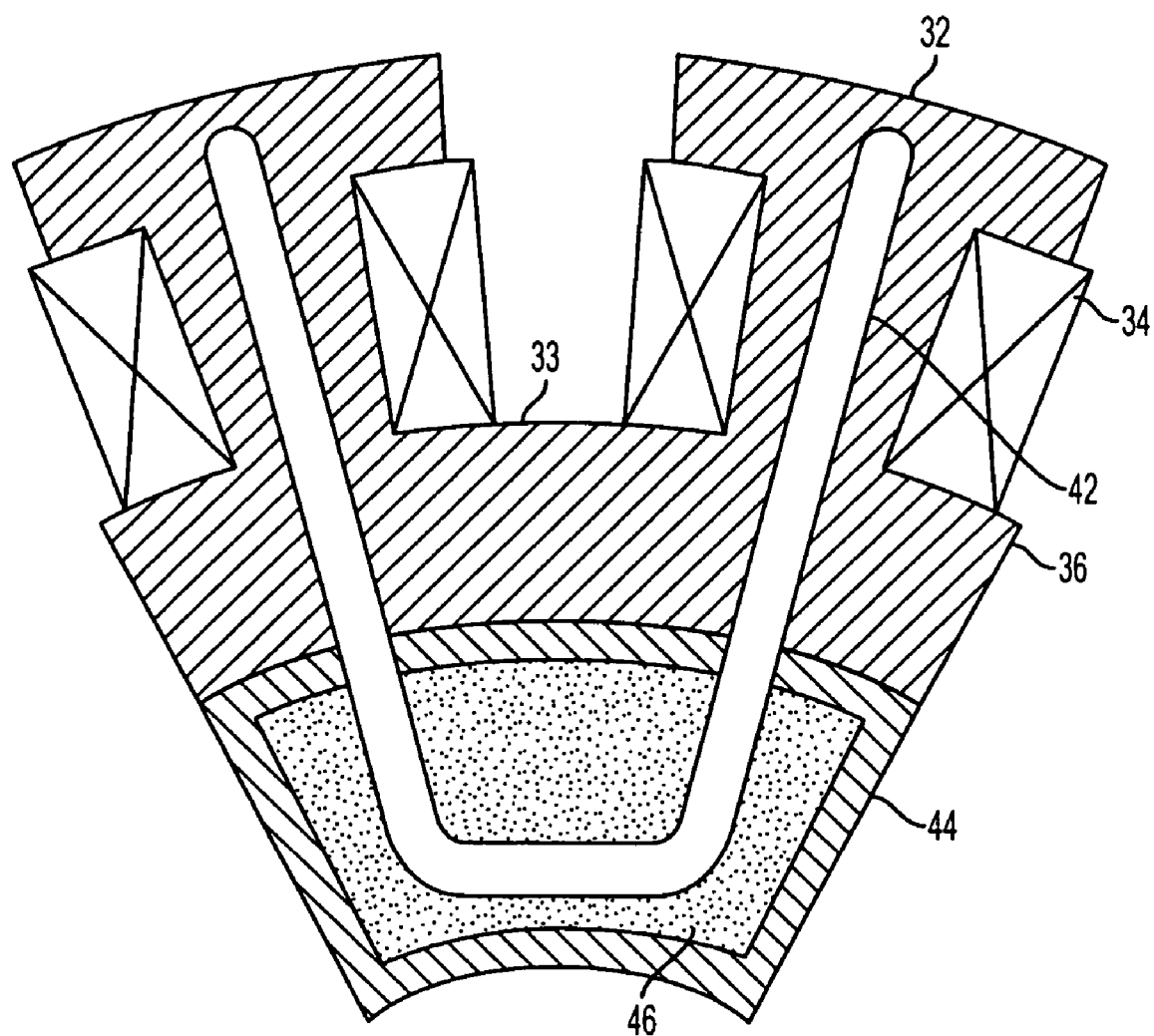
FIG. 4 is a diagram of a stator core segment having another cooling arrangement in accordance with the present invention.

FIG. 4 is a cross-sectional diagram of a stator core segment having another cooling arrangement in accordance with the present invention. In this arrangement, adjacent poles each have embedded therein an end portion of the same flexible U-shaped heat pipe 42. The end portions of the heat pipe are joined within the heat sink structure 44 that is external to the core segment. The heat sink structure, as in FIG. 3, may include a porous or lattice structure 46 that facilitates heat transfer.

Figure 2:
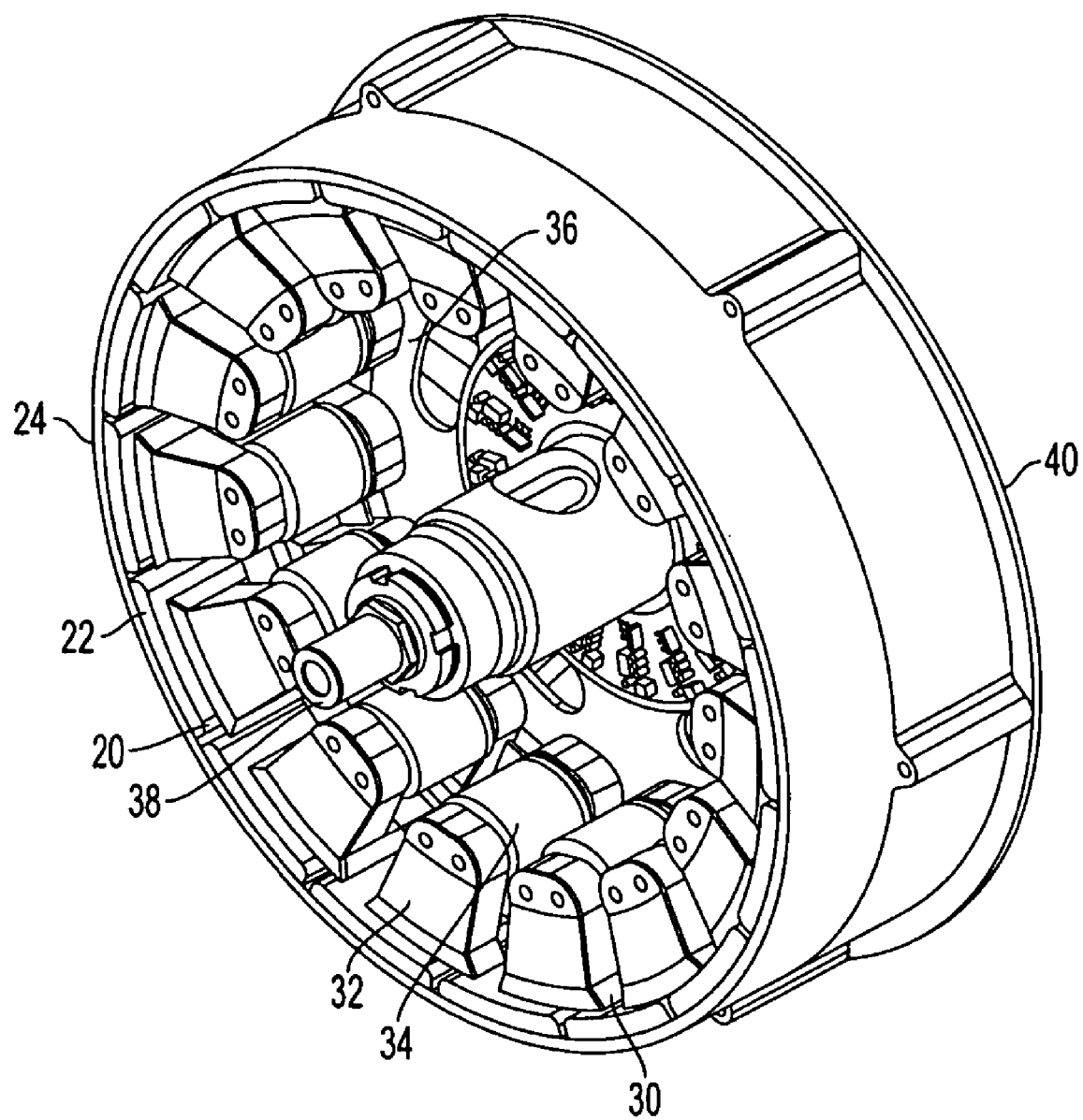
FIG. 2 is a partial perspective view of a motor having isolated electromagnet stator core segments, the poles of each core segment being aligned in a direction that is parallel to the axis of rotation of the motor.
Figure 5:
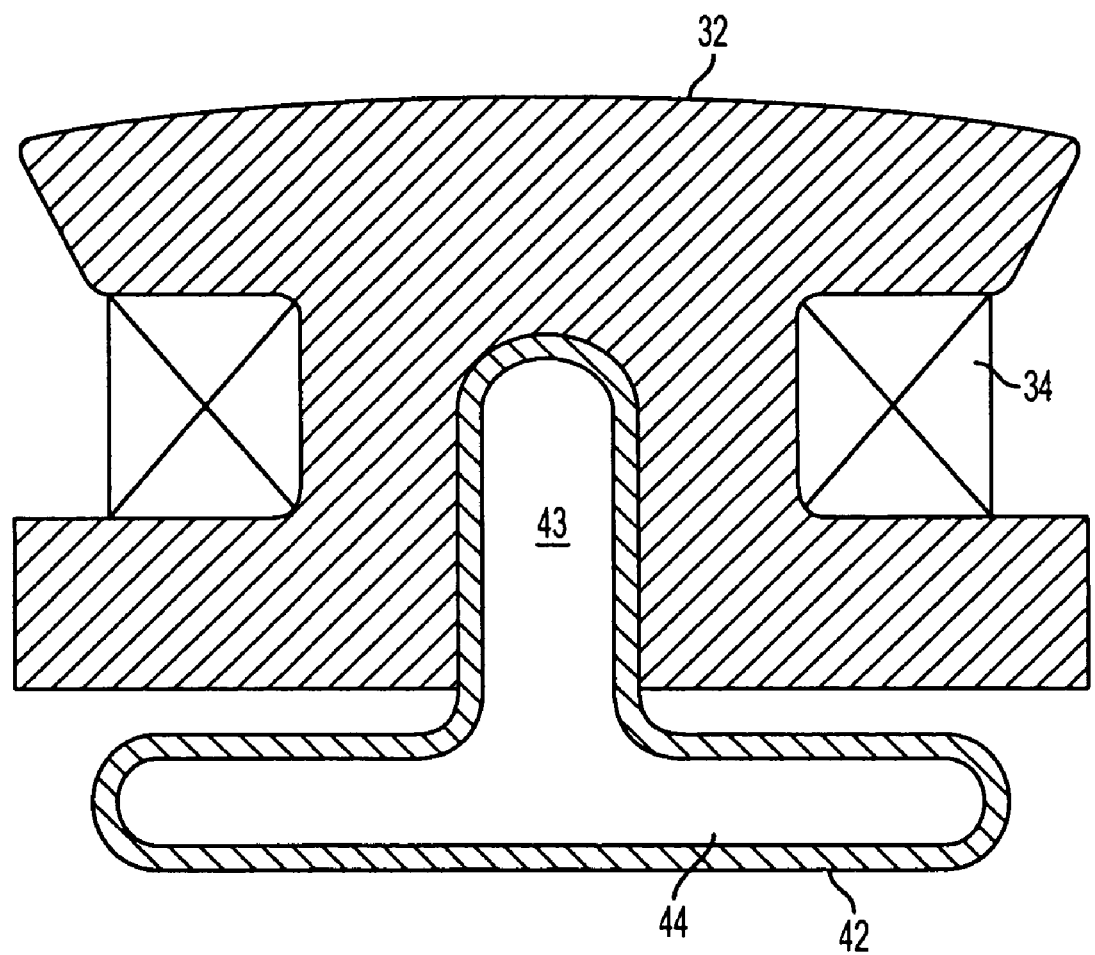
FIG. 5 is a diagram of a stator core segment having yet another cooling arrangement in accordance with the present invention.

FIG. 5 is a diagram of a stator core segment having yet another cooling arrangement in accordance with the present invention. Pole 32 may be one pole of a multiple pole core segment aligned in a direction parallel to the axis of rotation, such as depicted in FIG. 2. The cross-section is taken in a plane perpendicular to the axis of rotation. FIG. 5 also is representative of a pole 32 that is one of a plurality of poles of integral core or of an isolated pole pair segment. In the latter cases, the cross-section is taken in a plan parallel to the axis of rotation. Heat pipe 42 is formed in a T-shaped configuration. Cylindrical leg 43 is partially embedded in the stator core along the radial direction. Leg portion 44 is situated outside of the stator core and my have sufficient surface area to adequately dissipate the heat of the core without an additional external heat sink. If necessary, a heat sink structure similar to those shown in FIGS. 3 and 4 may be implemented.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, heat pipes can be embedded in locations of the flux path that are not critical to machine operation if CFD analysis indicates that additional cooling is desirable. Some machine applications may be compatible with placement of heat pipes at the periphery of the core segments or between the core and the windings. The invention can be implemented in various motor topologies, such as radial configurations, axial configurations, with the stator being either inverted or non-inverted with respect to the rotor. Various wick designs may be considered for specific heat pipe configurations, as well as the use of various heat exchange configurations.

What is claimed is:

1. An electric machine comprising:
   a ferromagnetic salient pole stator core;
   windings formed on poles of the stator core;
   at least one heat pipe at least partially embedded in the stator core;
   wherein heat generated during peak excitation of the windings is transferred to the heat pipe,
   wherein the stator core comprises a plurality of multiple pole core segments, each core segment having embedded therein at least one heat pipe, and
   wherein the heat pipe has a T-shaped configuration comprising a first portion partially embedded in the stator core along the radial direction and a second portion situated outside of the stator core, the first and second portions generally perpendicular to each other.

* * * * *